United States Patent [19]

Irwin

[11] Patent Number: 5,039,785
[45] Date of Patent: Aug. 13, 1991

[54] PREPARATION OF AROMATIC POLYAMIDE HAVING PENDANT CARBOXYL GROUPS

[75] Inventor: Robert S. Irwin, Wilmington, Del.

[73] Assignee: E. I. du Pont de Nemours and Company, Wilmington, Del.X

[21] Appl. No.: 446,338

[22] Filed: Dec. 5, 1989

[51] Int. Cl.⁵ .............................................. C08G 69/28
[52] U.S. Cl. .................................. 528/315; 524/606; 528/182; 528/183; 528/184; 528/314; 528/329.1; 528/331
[58] Field of Search ............... 528/331, 315, 314, 182, 528/183, 184, 329.1

[56] References Cited

U.S. PATENT DOCUMENTS 3,386,965  6/1968  Huffman et al. ..................... 260/78

OTHER PUBLICATIONS

Hinderer et al., "Aromatic Copolyamides Containing Pendant Carboxyl Groups", *Applied Polymer Symposium*, No. 21, 1-9, (1973).

Primary Examiner—Harold D. Anderson

[57] ABSTRACT

High molecular weight aromatic polyamides with pendant carboxyl groups.

6 Claims, No Drawings

PREPARATION OF AROMATIC POLYAMIDE HAVING PENDANT CARBOXYL GROUPS

BACKGROUND OF THE INVENTION

In the polymerization of the free diamine, 4,4'-diaminodiphenic acid (DPA) with terephthaloyl chloride by standard procedures, e.g., in an alkylamide solvent at low temperature, low molecular weight polymer, inherent viscosity <1.5 is obtained. When the dihydrochloride of DPA is combined with a solvent, such as dimethylacetamide (DMAc) or N-methylpyrrolidone (NMP), it dissolves in about one hour because the basicity of the solvent (present in large excess), though low, enables it to dissociate to free amine. Subsequent reaction with terephthaloyl chloride again gives low molecular weight polymer. This behavior is believed to relate to the unusual nature of DPA, namely, the fact that it is a bis(aminoacid). As such, the compound has a propensity to form internal salt links with itself which are highly insolubilizing. Even storage of DPA in the free diamine state for short periods while not precluding dissolution, can deactivate some of the amino groups with regard to their ability to react with terephthaloyl chloride, thus effectively unbalancing stoichiometry and limiting polymer molecular weight. The process of the present invention provides a procedure to overcome this problem.

SUMMARY OF THE INVENTION

This invention provides a process for preparing aromatic polyamide of increased molecular weight containing the following repeat unit:

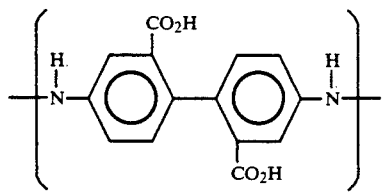

comprising reacting 4,4'-diaminodiphenic acid as the dihydrochloride and optionally other aromatic diamine reactants in substantially stoichiometric proportions with one or more dicarboxylic acid reactants in a combination of an alkylamide and an amount of tertiary amine substantially equivalent to the dihydrochloride of 4,4'-diaminodiphenic acid.

Also included in the present invention is a class of aromatic (co)polyamides consisting essentially of the following repeat units:

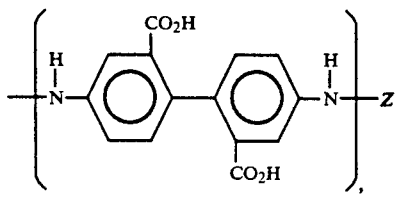

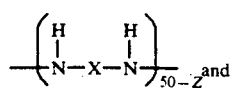

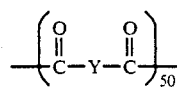

the units being indicated on a mole % basis, wherein Z is from 20 to 50 mole percent, X represents 1,4-phenylene or 3,4'-oxydiphenyl and Y represents 1,4-phenylene, and fibers, films and spin dopes thereof.

DETAILED DESCRIPTION OF THE INVENTION

The present invention can be expected to provide a route to paramid fibers of greater compressive strength due to increased cohesion between polymer chains because of hydrogen or ionic binding. It is also believed that the presence of carboxyl substituents along the polymer chain will enhance bonding power to matrix materials in composites, As presently understood, when the dihydrochloride of DPA is stirred with the alkylamide slurry containing an equivalent amount of a suitable tertiary amine, the DPA is immediately liberated and can react shortly thereafter with the dicarboxylic acid reactant to form a solution of high molecular weight polymer. By choice of a suitable tertiary amine, such as tributylamine, dimethylaniline, diethylaniline and N-methylmorpholine, a reasonably soluble hydrochloride is formed and the polymerization procedure directly provides a spin dope. In the event the tertiary amine, e.g. triethylamine, forms an insoluble hydrochloride, the latter may be separated by centrifuge or the polymer may be precipitated and then redissolved.

Aromatic polyamides have been prepared in the past from amine hydrochloride. Poly(1,4-benzamide) is prepared from the hydrochloride, p-amino-benzyl chloride hydrochloride, because the free amino-benzoyl chloride is unstable and would react with itself. A number of disclosures exist where a tertiary amine is present in the polymerizing solvent to accept HCl as it is formed in the polymerization. This is distinct from use of the tertiary amine to liberate diamine in situ. The use of the diamine dihydrochloride with an equivalent amount of tertiary amine offers no special advantage with diamine dihydrochlorides other than DPA dihydrochloride (DPA.2HCl) and, in some cases, does not work at all. For example, equivalent amounts of tertiary amine will not quantitatively liberate free p-phenylene diamine (PPD) from the dihydrochloride even at high temperature, unless considerable excess of base is used. Other methods of liberating DPA from the dihydrochloride, such as With CaO, Li₂O, LiOH, are unsatisfactory. Byproduct water will attack the diacid chloride and interfere with the polymerization reaction.

The tertiary amines that are useful in the process of this invention are employed in anhydrous form and in amounts substantially equivalent to the dihydrochloride. As solvents for the polymerization reaction, one may employ DMAc, NMP or tetramethylurea (TMU).

The polymerization is carried out at temperatures generally in the range of −15° to 30° C., preferably from −5° to 20° C.

The key to the present inventive process is the use of the dihydrochloride of diaminodiphenic acid rather than the free acid. Diaminodiphenic acid has the tendency to react with itself. This may cause changes in stoichiometry between the diamine and diacid reactants, cross-linking or side reactions that frustrate the attainment of desired high molecular weight chain extended aromatic polyamides. As for the other aromatic diamine and dicarboxylic acid reactants, they may be in the form of the diamine or diacid or their functional equivalents such as the acid chloride, the acid ester, etc. Such functional equivalents are intended to be encompassed by the phrase "diamine reactant" or "dicarboxylic acid reactant". Illustrative of such reactants are p-phenylene diamine, m-phenylene diamine, 3,4'-oxydianiline, terephthalic and isophthalic acids among others.

The novel aromatic polyamides which may be prepared by the present invention include (co)polyamides consisting essentially of the following repeat units in proportions as indicated:

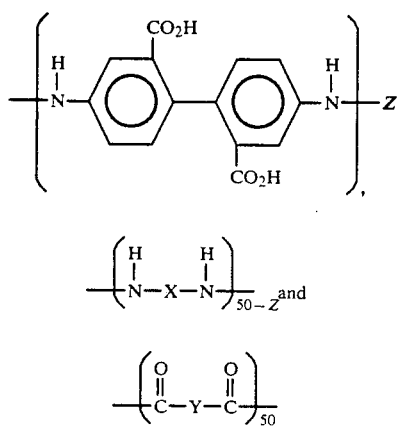

where Z is from 20 to 50 mole percent, that is, the (co)polyamide may consist essentially of units I and III when Z is 50 mole percent or may consist essentially of as little as 20 mole percent of unit I with up to 30 mole percent of unit II and the remainder being unit III. It is intended that units II and III represent at least one diamino or diacid moiety respectively. Thus X may be 1,4-phenylene, 3,4'-oxydiphenyl or a mixture thereof while Y may represent 1,4-phenylene. It has been found that within these constraints the (co)polyamides are generally soluble in organic solvents and would be particularly useful because of the substantial number of reactive $CO_2H$ substituents present.

Spin dopes of the polymers may be made in concentrated sulfuric acid or in organic solvents such as alkylamides. Generally a polymer concentration of from 4 to 20 wt. percent has been found to give satisfactory results.

TEST PROCEDURE

Inherent Viscosity (I.V.) is determined as follows:

$$I.V. = \frac{\ln(R.V.)}{C}$$

where R.V. is the relative viscosity and C is the concentration in grams of polymer per deciliter of solvent, typically 0.5 g in 100 ml. (Thus, the units for inherent viscosity are dl/g.) The relative viscosity is determined by dividing the flow time of the dilute solution in a capillary viscometer by the flow time for the pure solvent. The flow times are determined at 30° C.

For NMP or DMAc soluble materials, approximate I.V. is determined by combining solvent with the polymerizate to give a 0.5% solution and comparing the flow time of this with flow time of the pure solvent. For exact measurement or if there is insoluble amine hydrochloride present, the polymer must be precipitated by excess water in a blender, filtered, washed, dried 3 hr at 100° C., and redissolved in NMP, DMAc or 100% $H_2SO_4$ at room temperature to give a 0.5% solution.

The (co)polyamides of this invention are of fiber forming molecular weight, preferably having an I.V. of at least 1.0, more preferably at least 3.5.

TENSILE

Tensile measurements were made on a single filaments following the test procedure found in ASTM D 2101-82. The filaments were conditioned at 21° C. (70° F.) and 65 percent relative humidity and tested on a conventional tensile tester using flat clamps with rubber facing and a 2.5 cm (1") gauge length at a 10%/min strain rate (for flow elongatin, 0–8%). T is tenacity at break in gpd, M is the initial modulus in gpd and E is the break elongation in %.

Except for the controls, the following examples are illustrative of the present invention and are not to be construed as limiting.

EXAMPLE 1

10.306 g of the dihydrochloride of diaminodiphenic acid (DPA.2HCl) (0.0297 mole) was added to a solution of 6.52 ml (6.00 g; 0.0594 mole) anhydrous N-methylmorpholine in 94.0 ml anhydrous DMAc in a resin kettle with a Hastelloy stirrer under a slow current of $N_2$ to exclude atmospheric moisture. Following complete dissolution of the DPA.2HCl, the solution was cooled to −10° C. and 6.029 g terephthaloyl chloride (0.0297 mole) added quantitatively all at once. After a brief interval as a liquid of rapidly increasing viscosity, a clear gel was formed. After standing overnight at room temperature, polymer was precipitated by treating with excess water in a blender, then filtered, washed and dried. I.V. of the polymer determined in 100% $H_2SO_4$ was 8.80 at 30° C.

EXAMPLE 2

15.449 g DPA.2HCl (0.0448 mole) slurried with DMAc in a resin kettle, under dry $N_2$, was treated with 13.34 g anhydrous diethylaniline (0.0896 mole) to give a clear solution within about 10 min at −10° C. 9.09 g terephthaloyl chloride (TCl) (0.0448 mole) was added to give a 5.6% clear viscous solution of the polymer. 2.50 g anhydrous CaO (0.0448 mole) was added to neutralize HCl formed in the polymerization to give a clear viscous spin dope, useful for wet spinning. I.V. of the polymer by dilution to 0.5% solids with DMAc was 7.21. (A duplicate run gave I.V.=5.45).

COMPARATIVE EXAMPLE A 10.146 g DPA (0.0373 mole) in 120 ml DMAc (113 g) under anhydrous conditions as in EXAMPLE 1 and 2, was treated with 7.572 g terephthaloyl chloride (0.0373 mole) to give a clear yellow dope of modest viscosity. I.V. of the polymer by dilution with DMAc to 0.5%=1.26.

COMPARATIVE EXAMPLE B

Using 120 ml DMAc containing 4.10 g anhydrous CaCl as solvent, under otherwise identical circumstances to COMPARATIVE EXAMPLE A, I.V. of the polymer by dilution with DMAc to 0.5%, averaged 1.20 I.V. on a precipitated polymer sample, redissolved at 0.5% in 100% $H_2SO_4$, was 1.49.

COMPARATIVE EXAMPLE C

Under anhydrous conditions, at about 10° C., 10.298 g DPA.2HCl (0.0299 mole) was stirred with 90 ml N-methyl-pyrrolidone at 10°-21° C. After 1.5 hr. all the DPA.2HCl had dissolved. Addition of 6.06 g terephthaloyl chloride (0.0299 mole) gave a small increase in solution Viscosity, such that I.V. of the polymer (not measured) was judged to be very low.

EXAMPLE 3

Under anhydrous conditions as in EXAMPLES 1 and 2, 3.81 g PPD (0.0706 mole), 12.17 g DPA 2HCl (0.0706 mole), 10.512 g diethylaniline (0.1412 mole) was added to a solution of 10.865 g $CaCl_2$ (0.0988 mole) in 250 ml NMP and gave a clear solution after brief stirring. A shear anisotropic viscous dope was formed by addition of 14.322 g TCl (0.0706 mole). I.V. of a precipitated polymer sample in 100% $H_2SO_4$ was 5.53.

COMPARATIVE EXAMPLE D

When 4.818 g DPA.2HCl (0.0140 mole) and 2.528 g of the dihydrochloride of paraphenylenediamine (PPD.2HCl) (0.0140 mole) were combined, under conditions of EXAMPLES 1 or 2, with 133 ml DMAc and 8.32 g diethylaniline (0.0558 mole), the PPD.2HCl failed to dissolve completely in 2 hr at room temperature even after heating at 80° C. It was therefore not possible to proceed with reaction of the diacid chloride.

EXAMPLE 4

A mixture of 10.306 g DPA.2HCl (0.0297 mole), 6.0 g N-methylmorpholine (6.5 ml; 0.0594 mole), and 94 ml DMAc gave a clear solution at about 10° C. Polymerization with 6.029 g isophthaloyl chloride gave a viscous solution from which the hydrochloride of N-methylmorpholine crystallized out. I.V. of isolated polymer was 1.89 to 2.30.

EXAMPLE 5

In a flamed-out resin kettle equipped with a cage-type stirrer, dry nitrogen purge, and provision for external cooling, a slurry of 9.419 g DPA.2HCl (0.0546 mole) with 166 g anhydrous NMP (161 ml) was treated with 8.14 g diethylaniline (0.109 mole) at room temperature to provide a solution containing free DPA. 5.460 g 3,4'-Oxydianiline (0.0546 mole) was added to this solution, which was then cooled to 10° C. 11.08 g Terephthaloyl chloride (0.0546 mole) was added and the solution stirred for 1 hr at room temperature. Inherent viscosity, determined for an aliquot of the viscous, clear solution diluted with NMP to 0.5% solids, was 2.68.

Tough, clear, almost colorless films were prepared by casting the above dope on a glass plate, evaporating off the solvent over 3 hr in an oven at 80° C., soaking the resulting film in cold water for at least 2 hr to extract HCl, 15 min in hot tap water, and drying at 80° C. for 2 hr under restraint.

EXAMPLE 6

A slurry of DPA.2HCl (12.17 g; 0.0353 mole) in a solution of PPD (3.81 g; 0.0353 mole) in NMP (243 g; 250 ml)/$CaCl_2$ (10.87 g; 0.099 mole) at room temperature was treated with diethylaniline (10.51 g; 0.0705 mole). To this solution, at 10° C., was added terephthaloyl chloride (14.32 g; 0.0706 mole) to form a viscous, clear, shear anisotropic solution, containing 6.0% polymer. I.V. was 5.52. Concentration was adjusted to 5.8% by addition of NMP (50 ml) to reduce viscosity slightly to facilitate spinning.

The dope, at 83° C., was extruded via a single hole spinneret of diameter 0.13 mm (0.005 in) and length 0.38 mm (0.015 in) into methanol at 22° C. with a wind-up speed of 138 m/min, spin stretch factor of 1.82, to give T/E/Mi=2.3/7.1/135. The fiber was passed through nitrogen at 440° C., during 10 sec, at 2-5 m/min-to give T/E/Mi=3.8/2.8/220 (best break 3.2/2.8/220).

I claim:

1. A process for preparing an aromatic (co)polyamide of increased molecular weight comprising reacting 4,4'-diaminodiphenic acid dihydrochloride with or without other aromatic diamine reactants in substantially stoichiometric proportions with one or more aromatic dicarboxylic acid reactants in a combination of an alkylamide and an amount of tertiary amine substantially equivalent to the dihydrochloride of 4,4'-diaminodiphenic acid.

2. A process according to claim 1 wherein the alkylamide is N-methylpyrrolidone, dimethylacetamide or tetramethylurea.

3. A process according to claim 1 wherein the tertiary amine is dimethylaniline, diethylaniline, tributylamine, triethylamine or N-methylmorpholine.

4. A process according to claim 1 wherein the dicarboxylic acid reactant is terephthaloyl chloride.

5. A process according to claim 4 wherein other diamine reactants present are p-phenylene diamine or 3,4-oxydianiline.

6. A process according to claim 1 wherein the dihydrochloride of 4,4'-diaminodiphenic acid constitutes from 20 to 50 mol % of the reactants.

* * * * *